A. B. LANDIS.
CUTTER HEAD FOR BOLT CUTTING MACHINES.
APPLICATION FILED OCT. 7, 1905.
948,886.
Patented Feb. 8, 1910.
3 SHEETS—SHEET 1.
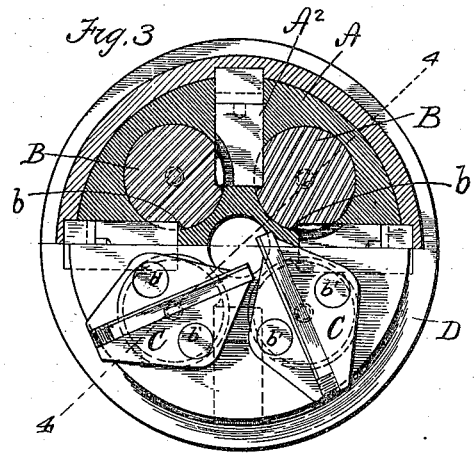
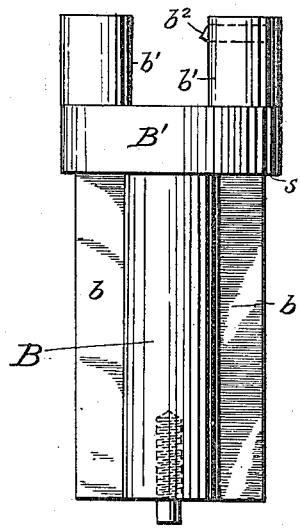
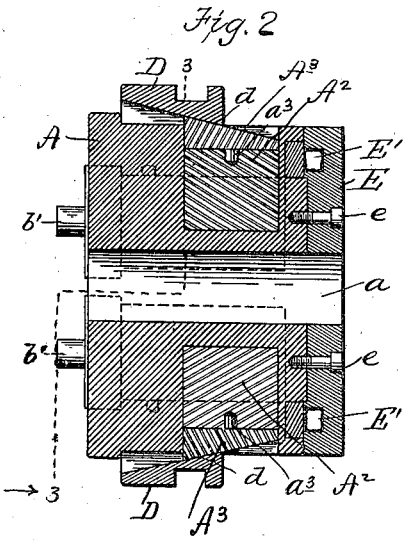
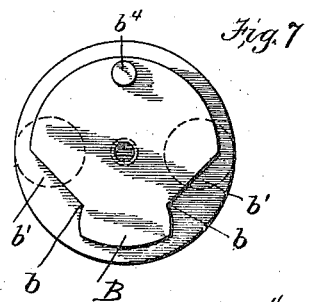
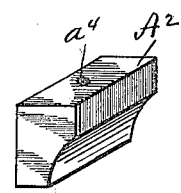
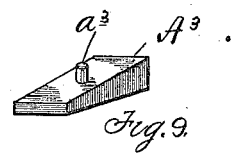
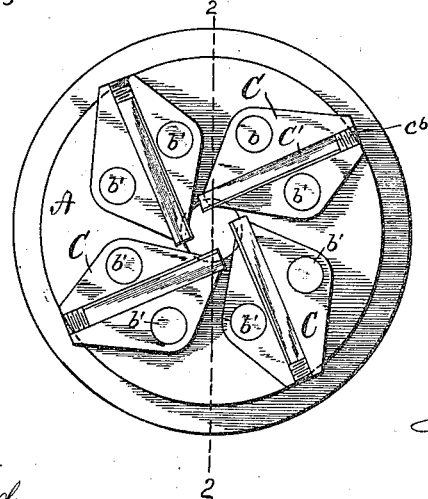
Inventor
Abraham B. Landis,
per E. W. Bradford
Attorney
Witnesses
F. L. Durand
W. H. Durand A. B. LANDIS.
CUTTER HEAD FOR BOLT CUTTING MACHINES.
APPLICATION FILED OCT. 7, 1905.

948,886.

Patented Feb. 8, 1910.
3 SHEETS—SHEET 2.

Witness
F. L. Ourand
W. H. Ourand

Inventor
Abraham B. Landis,
per E. W. Bradford
Attorney

A. B. LANDIS.
CUTTER HEAD FOR BOLT CUTTING MACHINES.
APPLICATION FILED OCT. 7, 1905.
948,886.
Patented Feb. 8, 1910.
3 SHEETS—SHEET 3.
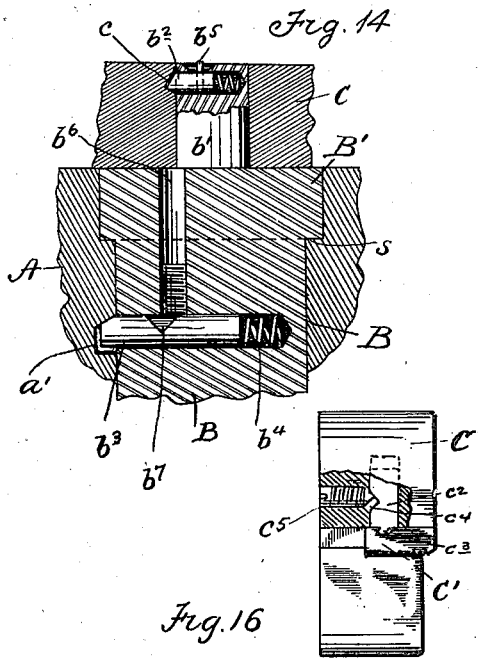
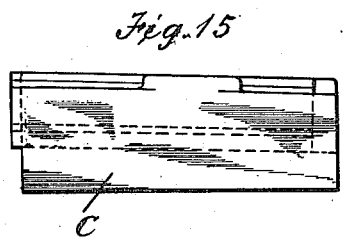
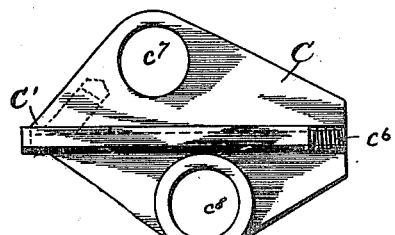
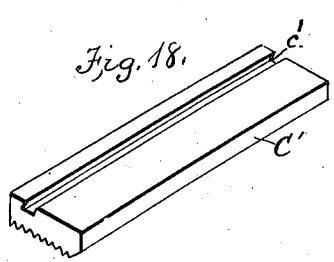
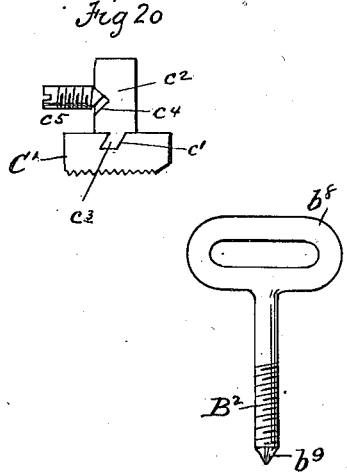

UNITED STATES PATENT OFFICE.

ABRAHAM B. LANDIS, OF WAYNESBORO, PENNSYLVANIA.

CUTTER-HEAD FOR BOLT-CUTTING MACHINES.

948,886.

Specification of Letters Patent.　Patented Feb. 8, 1910.

Application filed October 7, 1905. Serial No. 281,813.

*To all whom it may concern:*

Be it known that I, ABRAHAM B. LANDIS, a citizen of the United States, residing at Waynesboro, in the county of Franklin and State of Pennsylvania, have invented certain new and useful Improvements in Cutter-Heads for Bolt-Cutting Machines, of which the following is a specification.

My said invention consists in certain improvements and the construction and arrangements of parts of cutter-heads for screw or bolt thread cutting machines of that general construction shown in my Patent No. 690,300 of December 31, 1901, whereby the construction is simplified and made less expensive to construct, all as will be hereinafter more fully described and claimed.

Figure 5:
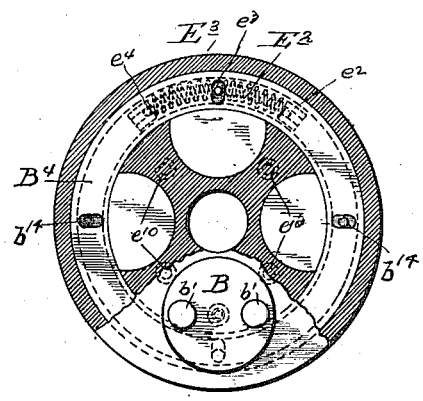
Figure 10:
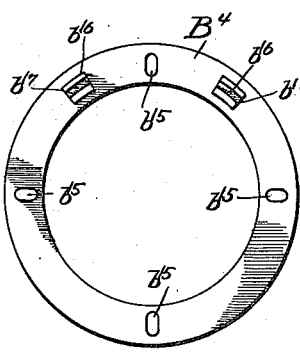
Figure 11:
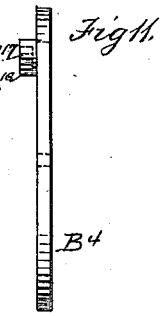
Figure 4:
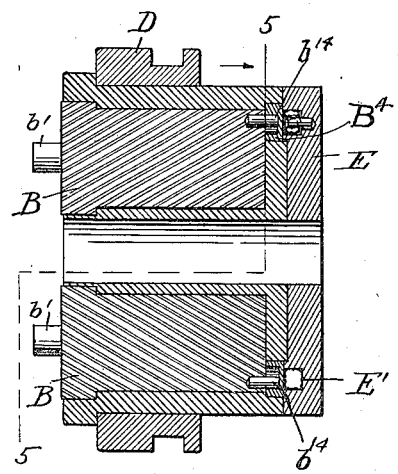
Figure 12:
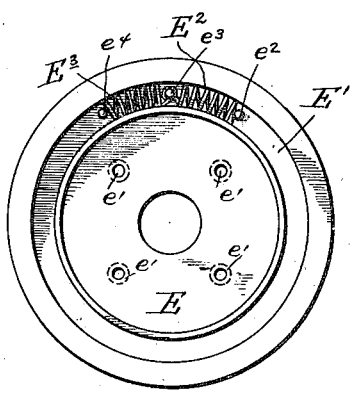
Figure 13:
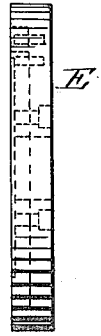

Referring to the accompanying drawings which are made a part hereof and on which similar reference characters indicate similar parts, Figure 1 is a front elevation of one of my improved cutter-heads with the cutters in position to form the cutting-die, Fig. 2 a central longitudinal section on the dotted line 2—2 in Fig. 1, the cutter holders being removed, Fig. 3 a view partly in transverse section looking in the direction indicated by the arrows from the dotted line 3—3 in Fig. 2, Fig. 4 a central longitudinal section on the dotted line 4—4 in Fig. 3, Fig. 5 a view partly in transverse section looking in the direction indicated by the arrows from the dotted line 5—5 in Fig. 4, and Figs. 6 to 20, inclusive, are detail views of separate parts intended to illustrate their form and arrangement more clearly, as will be hereinafter more fully described.

In said drawings the portions marked A represent the body or casing of the cutter-head, B the shafts or cylinders for supporting the cutter-holders, C said cutter-holders, D a cam-ring, and E the rear cap or plate covering the rear end of the cutter-head.

The body A is a casting of suitable size and form to contain the bearings and sockets for the several parts composing the operative members of the device. It is provided with a central perforation $a$ by which it is mounted upon the machine spindle.

The cylinders B are preferably four in number and each is mounted in a longitudinal socket or perforation in the body A, equi-distant around the central perforation $a$ therein. Each of said cylinders is formed with notches $b$ on opposite sides and in the sides adjacent to each other. (See Figs. 3 and 7.) Their forward ends are formed with enlarged portions B′ forming shoulders $s$ in their outer surfaces, (see Fig. 6) which set against shoulders in the outer ends of the perforations in the body A, which are correspondingly enlarged. Said ends of the cylinders each have two projecting pins $b'$ on which the cutter-holders C are mounted. One of said pins is provided with a spring-pawl $b^2$ adapted to engage in a notch in the side of the perforation in the cutter-holder which passes over said pin, as shown in Fig. 14, and retain said cutter-holder in position. Said cylinders B are each provided in one side with a transverse perforation in which is mounted a pin $b^3$ adapted to be forced outwardly to engage with a circumferential groove $a'$ in the body A by a spring $b^4$ mounted behind it (see Fig. 14). Said groove $a'$ is preferably formed with a tapered front side and the front side of the sliding pin $b^3$ is also tapered to bear against the tapered side of said groove. The several springs $b^4$ will thus operate, through said tapered faces, to draw each cylinder B back firmly to its seat in the body A with shoulders $s$ bearing firmly upon said seat, and prevent any vibration thereof in a longitudinal direction.

When it is desired to remove said cylinders, or any one of them, the cutter-holders C are removed from the pins $b'$ by sliding back the spring pawl $b^2$ by means of the pin $b^5$, which projects from one side thereof through a slot in the end of said pin $b'$, and then inserting a screw rod B² formed with a handle $b^8$ and a conical end $b^9$ (see Fig. 19) into a perforation $b^6$, which runs from the front end of the cylinder into the perforation containing the pin $b^3$ and in position so that the conical end $b^9$ of said rod B² will engage the rear side of a V-notch $b^7$ in the side of said pin and force said pin back out of engagement with the groove $a'$ in the body A. Said rod B² being formed with a screw-threaded end and the lower end of perforation $b^6$ being screw-threaded, the parts engage so that said rod may be used for withdrawing said cylinder B, the loop $b^8$ formed on its outer end forming a convenient handle for this purpose.

Radial slots or ways are formed in the body A between the cylinders B, as most clearly shown in Fig. 3, and sliding pawls A² are mounted therein. Said pawls are each formed with one inner corner square and the other cut away or concaved, as best shown in Fig. 8. The square corner of each pawl is adapted to engage a notch $b$ in the side of one of the cylinders, while its opposite side being cut away will clear the opposite cylinder. A wedge or cam $A^3$ is mounted on the top surface of each of said sliding pawls by means of a pin $a^3$ engaging with a perforation $a^4$, said pin and perforation being centrally located in their respective parts so that the wedge or cam block $A^3$ may be reversed when desired.

The cutter-holders C are of substantially the form shown and described in the above mentioned patent and are provided with suitable perforations $c^7$ and $c^8$ to receive the pins $b'$ of the cylinder B, a notch $c'$ of the form shown in Fig. 14 being formed in the wall of one of said perforations to receive the spring pawl $b^2$ and lock the holder in place, as above described. The cutters $C'$ are mounted in longitudinal grooves in the outside faces of said cutter-holders and each is held in position by means of a sliding pin $c^2$ mounted in a perforation which extends back into the body of the cutter-holder from the back side of said groove, as most plainly shown in Figs. 16 and 20. Said pins $c^2$ are each formed with a tongue $c^3$ adapted to engage with a groove $c'$ in the back of said cutter. Said groove $c'$ is formed with its side adjacent to the back of the groove in the cutter-holder cut under or dove-tailed and the tongue $c^3$ of the pin $c^2$ is correspondingly formed. A tapered or V-shaped recess or notch $c^4$ is formed in one side of said pin $c^2$ and a screw $c^5$ with a conical point is mounted in a screw-threaded perforation in the back side of the holder C and is adapted to engage at its point with the back side of said V-shaped notch and operate to draw said pin $c^2$ back into its recess, which serves by reason of the engaging cam faces of the groove $c'$ and pin $c^2$ to clamp the cutter $C'$ firmly against the back and the bottom of the groove in which it is mounted. This makes a most desirable holding means for the cutter inasmuch as it not only holds it very rigidly but all parts are concealed from sight. A screw plug or follower $c^6$ is mounted behind each cutter in the groove in the cutter-holder and may be used to force said cutter forward as it is worn away by use and secure it from backward movement, as shown and described in my Patent No. 409,208.

The cam-ring D is mounted to slide on the outside of the body A, being formed with a circumferential groove with which a shifting fork, not shown, is adapted to engage for operating it. It is formed with tapered faces or cams $d$ at the several points above the raidal slots in the body A in which the pawls $A^2$ with the cam backs $A^3$ are mounted. Said cam-faces are adapted to rest upon said cams $A^3$ and thus serve to slide said several pawls $A^2$ inwardly in said slots, which pawls, by reason of their square corners engaging with the notches $b$ in the sides of the several cylinders B, thus operate to rock said cylinders so as to open or close the cutter die, as will be presently more fully described.

A pin $b^{14}$ is mounted to project from the rear end of each of the cylinders B near its outside edge and each of said pins engages with a slot $b^{15}$ formed in a ring $B^4$, which is mounted in a circular recess in the rear end of the body A. Said pins $b^{14}$ serve as crank-pins and the ring $B^4$ serves to connect them so that all the cylinders will be rocked in unison. On the rear faces of said ring $B^4$ two projecting lugs $b^{16}$ are formed a short distance apart having grooves or recesses $b^{17}$ in their faces. See Figs. 10 and 11. Said lugs project into a circular groove $E'$ formed in the inner face of the rear plate E. Said rear plate E is secured over the rear end of the body A by means of screws $e$ projecting through perforations $e'$ therein and into screw-threaded perforations $e^{10}$ formed in said body to receive them. The groove $E'$ is formed in its inner face near its outer edge to register with the lugs $b^{16}$ of the ring $B^4$ into which said lugs project, as before described. Pins $e^2$, $e^3$, and $e^4$ are mounted in said groove on one side a short distance apart and two coiled springs $E^2$ and $E^3$ are mounted between said pins, one between pin $e^2$ and pin $e^3$ and the other between pin $e^3$ and the pin $e^4$, the inner end of each spring being preferably connected with pin $e^3$. See Figs. 12 and 13. The position of the ring $B^4$ is such that the slotted lugs $b^{16}$ will be adjacent to said pins $e^2$ and $e^4$ when the cutter die is open and the outer end of each spring will rest against the inner ends of said lugs when the cutter die is closed. By sliding the cam-ring D to the position shown in Fig. 2, which operates to turn the cylinders so as to turn the ring $B^4$ toward one or the other of the pins $e^2$ or $e^4$, one of the lugs $b^{16}$ will compress one or the other of the springs $E^2$ or $E^3$ between said lug and the projecting pin $e^2$ of the plate E so that when ring D is slid back said spring will expand and return the ring $B^4$ to its normal position and at the same time turn the cylinders B and automatically open the cutter-die, as will be readily understood.

When it is desired to cut in the opposite direction for left hand threads and operate the cutter-head reversely, the cams $A^3$ and pawls $A^2$ are removed from the radial slots and turned around so that the square edges of said pawls will engage with the opposite sides of the cylinders from those with which they engaged in the reverse position, and the cams $A^3$ are changed or turned end for end on said pawls A², so that they will occupy the same position as before, when the operation of the cylinders will be in the reverse direction, as will be readily understood and the opposite one of the springs E² or E³ will be brought into service in returning said parts to open the die.

Having thus fully described my said invention, what I claim as new and desire to secure by Letters Patent, is:—

1. A cutter-head for bolt cutting machines comprising a body, a series of cylinders mounted to rock in bearings arranged concentrically around the axis of said body, cutter-holders carrying the cutters mounted on the outer ends of said cylinders, sliding pawls mounted in radial ways in said body and engaging with the sides of said cylinders, the outer surfaces of said pawls having cam faces, a sliding ring on said body having cam faces adapted to coöperate with the cam faces of said pawls, a connection between said several cylinders at one side of their centers, and a spring interposed between a fixed part and a part of said connection for returning said cylinders to open the die after being closed by the cam-ring, substantially as set forth.

2. A cutter-head comprising a body, cylinders mounted therein carrying the cutters, a ring mounted in said body and connected to each of said cylinders, springs mounted between a fixed part and a part of said ring for returning said cylinders to normal position, and means for rocking said cylinders to close the die against said spring, substantially as set forth.

3. A cutter-head comprising a body, cutter bearing cylinders mounted to rock in bearings arranged concentrically around the axis of said body, cam-faced pawls mounted in radial ways in said body to engage with notches in the sides of said cylinders, a sliding ring on said body having cams to operate said pawls, a crank-pin projecting from each of said cylinders, a ring mounted in a recess in said body and engaging each of said crank-pins, and springs mounted between parts of said ring and fixed parts to hold or return said ring and the connected cylinders to normal position, substantially as set forth.

4. A cutter-head comprising a body, cutter bearing cylinders mounted in bearings therein, each of said cylinders being formed with a transverse perforation in one side having a spring-pin mounted therein with a tapered point, and each of the bearings having a groove with a tapered side with which said pin is adapted to engage, whereby said cylinder is securely held back in its seat, and means for operating said cylinders to open and close the cutter-die, substantially as set forth.

5. A cutter-head comprising a body, cylinders mounted in bearings therein, cutter-holders mounted thereon, said cylinders being formed with shoulders near their outer ends and the bearings in which they are mounted having corresponding shoulders, and a transverse pin mounted in an aperture in each cylinder, a groove being formed in the face of the bearing for said pin to engage, each cylinder being formed with a perforation leading through the end thereof from said transverse aperture and a V-shaped notch being formed in the side of said pin, whereby a pin with a conical end may be inserted in said perforation and engage said V-shaped notch to force said pin back out of engagement with said groove and permit the removal of the cylinder, substantially as set forth.

6. A cutter-head comprising a body, cylinders carrying the cutter-holders mounted in bearings in said body, means for opening and closing the cutter die, each of said cylinders having pins projecting from its front end on which said cutter-holders are mounted, one of said pins being provided with a spring mounted detent adapted to engage with a notch in the cutter-holder to lock it in position.

7. In a cutter-head, the combination, of the body, the cylinders mounted in bearings therein, the cutter-holders on said cylinders, means for rocking said cylinders to open and close the die, said cutter-holders and said cylinders being locked in position by spring mounted detents, and said detents mounted to slide to release said parts for removal, substantially as set forth.

8. In a cutter-head, the combination, of the body, the cylinders mounted in bearings around the axis of said body, inter-engaging shoulders on said cylinders and on said bearings affording a seat against which said cylinders may rest in backward movement into said body, cutter-holders mounted on pins projecting from the front end of said cylinders, means for removably securing said holders in place, and means for removably securing said cylinders in place access to which is covered by said cutter-holders when in place, substantially as set forth.

9. In a cutter-head, the combination, of the body, the cylinders, the cutter-holders with the cutters mounted therein, means for rocking said cylinders to open and close the die, each of said cylinders being provided with a spring locking device for holding it in place, and said locking devices, substantially as set forth.

10. A cutter-head comprising cutter-holders each of which is formed with a groove in its outer face in which the cutter is mounted, said cutters mounted in said grooves each being formed with a tapered groove in its back with which a sliding detent with a tapered side engages, said detents, and a screw-pin with a tapered point engaging a V-notch in one side of said pin to operate it and draw said parts snugly together, substantially as set forth.

11. A cutter-head comprising a body, cutter-holders mounted on rocking cylinders, said cylinders mounted in bearings around the axis of said body, sliding pawls mounted in radial ways engaging with the sides of said cylinders for operating them in one direction, a cam-ring for operating said pawls, a connection between said cylinders for securing them to rock in unison, and a spring between a fixed part on the body and said connection for operating reversely to said pawls, substantially as set forth.

12. In a cutter-head, the combination, of cutter-holders each formed with an angular seat extending longitudinally thereof for receiving the cutters, said cutters each formed with a tapered groove extending longitudinally thereof in its back, a sliding detent adapted to engage with said groove, and means for adjusting said detent in its seat for drawing the parts together, substantially as set forth.

13. A cutter-head comprising cutter-holders having right-angle seats and cutter bars secured therein to be supported in said angles, each of said cutter bars being formed with a tapered groove in its back, and a detent mounted in a seat in each of said cutter-holders and adapted to engage said tapered groove for securing the parts, and means for drawing the parts together, substantially as set forth.

14. A cutter for thread-cutting dies formed with a groove therein with sides parallel to each other and at an angle with the back of said cutter, for engaging with the holding devices, substantially as set forth.

15. A cutter for thread-cutting dies formed with a groove in its back extending longitudinally thereof one edge only of said groove being formed cut under for engagement with the holding devices, substantially as set forth.

16. A cutter-head comprising a cutter-holder having a cutter-bar mounted in an angular seat to be adjusted longitudinally thereon and formed with thread-cutting grooves on its face and with a groove in its back extending longitudinally thereof one edge of said groove being formed cut under, and means for engaging said cut under edge for securing said cutter-bar, substantially as set forth.

17. A cutter-head comprising a cutter-holder formed with a seat to receive the cutter bar, the cutter bar mounted therein formed with thread cutting grooves on its face and a tapered groove on its back, a screw for adjusting the longitudinal position of said cutter bar and a sliding detent for engaging said tapered groove and securing said cutter bar in position, substantially as set forth.

In witness whereof, I, have hereunto set my hand and seal at Waynesboro, Pennsylvania this 8th day of September, A. D. nineteen hundred and five.

ABRAHAM B. LANDIS. [L. S.]

Witnesses:
BEN F. LANDIS,
H. P. GARNER.